United States Patent Office
2,833,806
Patented May 6, 1958

2,833,806

METHOD OF PREPARING ETHYLENE PHOSPHITE

Ingenuin Hechenbleikner, Clarksburg, and Francis C. Lanoue, North Adams, Mass., assignors to Shea Chemical Corporation, Jeffersonville, Ind., and Columbia, Tenn., a corporation of Tennessee No Drawing. Application April 3, 1957
Serial No. 650,324

13 Claims. (Cl. 260—461)

This invention relates to the preparation of ethylene phosphite.

It is an object of the instant invention to prepare ethylene phosphite from relatively inexpensive starting materials.

A further object is to prepare ethylene phosphite in improved yields.

Yet another object is to prepare ethylene phosphite from a cyclic phosphorus ester of a monohydric phenol.

A still further object is to prepare ethylene phosphite from triethylene diphosphite.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Ethylene phosphite is useful as an insecticide, e. g., to kill red spider mites. Also, it is a good textile wetting agent, e. g., as a wetting agent for regenerated cellulose, cotton, etc. It is also a valuable chemical intermediate for forming phosphorus compounds, e. g., alkylethylene phosphites such as methylethylene phosphite, by reaction with the appropriate alkyl halide, e. g., methyl halide.

It has now been found that ethylene phosphite can be prepared in good yields by hydrolysis of aryl- or halo-arylethylene phosphites or triethylene diphosphite. Typical examples of aryl- and halo-arylethylene phosphites are phenylethylene phosphite, ethylene-3-chlorophenyl phosphite; ethylene-4-chlorophenyl phosphite; ethylene-2-chlorophenyl phosphite; ethylene-2,3-dichlorophenyl phosphite; ethylene-2,4-dichlorophenyl phosphite; ethylene-2,5-dichlorophenyl phosphite; ethylene-2,6-dichlorophenyl phosphite; ethylene-3,4-dichlorophenyl phosphite; ethylene-3,5-dichlorophenyl phosphite; ethylene-2-bromophenyl phosphite; ethylene-3-bromophenyl phosphite; ethylene-4-bromophenyl phosphite; ethylene-2-iodophenyl phosphite; ethylene-2-fluorophenyl phosphite; ethylene-2-chloro-4-bromophenyl phosphite; ethylene-2-methylphenyl phosphite; ethylene-3-methylphenyl phosphite; ethylene-4-methylphenyl phosphite; ethylene - 3,5 - dimethylphenyl phosphite; ethylene-2-ethylphenyl phosphite; ethylene-4-ethylphenyl phosphite; ethylene-2-hexylphenyl phosphite; ethylene-2-cyclohexylphenyl phosphite; ethylene-4-octylphenyl phosphite; ethylene-3-isobutylphenyl phosphite; ethylene-2-dodecylphenyl phosphite; ethylene-2-amylphenyl phosphite; ethylene-2-n-butylphenyl phosphite; ethylene-2-tertiary-butylphenyl phosphite; ethylene-2-secondary-butylphenyl phosphite; ethylene-2-phenylphenyl phosphite; ethylene-alpha-naphthyl phosphite; and ethylene-beta-naphthyl phosphite.

These aryl- and halo-arylethylene phosphites can be prepared in the manner described in application Serial No. 555,762, filed December 28, 1955, and Serial No. 635,148, filed January 22, 1957, of which latter application, this application is a continuation-in-part.

The triethylene diphosphite can be prepared in the manner described in application Serial No. 585,958, filed May 21, 1956.

The preferred starting materials are phenylethylene phosphite and triethylene diphosphite.

It is not necessary to employ a catalyst and, in fact, large amounts of strong acids such as hydrogen chloride should be avoided, since increased amounts of by-products are formed. Thus, when phenylethylene phosphite is reacted with an equimolar amount of hydrogen chloride, the reaction product is 2-chloroethylphenyl hydrogen phosphonate in almost quantitative yields.

[It may be noted that when one mol of benzylethylene phosphite (an aralkylethylene phosphite rather than an arylethylene phosphite) is reacted with one mol of hydrogen chloride by passing the latter at 20° C. into the benzylethylene phosphite until the theoretical amount has been absorbed and the mixture then heated in an autoclave, ethylene phosphite is obtained in good yields.]

In the hydrolysis reaction of the aryl- or halo-arylethylene phosphite or the triethylene diphosphite with water equivalent amounts are preferably employed, i. e., one mol of water per mol of aryl- or halo-arylethylene phosphite and 2 mols of water per mol of triethylene diphosphite. If an excess of phenylethylene phosphite is used, the yield of ethylene phosphite is reduced, whereas when an excess of water is employed, it is more difficult to insure adequate mixing and temperature control. The reaction goes readily at room temperature, and preferably the temperature is kept below 50° C., although this is not essential. It has been found desirable to employ an inert solvent which is compatible with the starting phosphite and water to insure homogeneity at the start of the reaction. As typical solvents, there may be mentioned alkane nitriles, e. g., acetonitrile, propionitrile, butyronitrile, capronitrile, etc., as well as ketones such as acetone, methyl ethyl ketone or alcohols, e. g., ethyl alcohol or even phenol itself.

A solvent is not essential and, in fact, when a heel of a previous run is used, equally satisfactory results are obtained, even if the solvent is omitted.

Generally, 25 to 100 parts of solvent are employed per 100 parts of starting phosphite. There need only be a small amount of heel, particularly if water and phosphite are added simultaneously.

In the instant specification and claims, all parts and percentages are by weight unless otherwise indicated.

With a heel, the phosphite and water can be added simultaneously.

*Example 1*

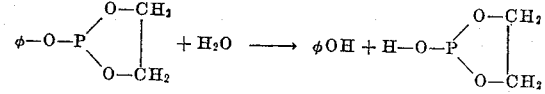

184 grams (one mol) of phenylethylene phosphite were mixed with 100 ml. of acetonitrile and then 18 grams (one mol) of water were gradually added at a temperature which was maintained between 20 and 40° C. by external cooling, since the reaction is exothermic.

The mixture was then stripped of acetonitrile at atmospheric pressure; the phenol formed was then stripped at 65 to 70° C. at 10 mm. vapor temperature and 90 to 125° C. pot temperature. The ethylene phosphite was then recovered by distillation as a viscous oil boiling at 110 to 130° C. at 0.1 mm. to 1.0 mm. The yield was 100 grams (92.6%). A re-distilled sample had a boiling point of 120 to 130° C. at 0.1 to 0.5 mm., a density $d_{15}^{25}$ 1.528, melting point <0° C., refractive index $n_D^{25}$ 1.48700 and was soluble in water, ethanol and acetone and insoluble in hexane and benzene.

Example 2

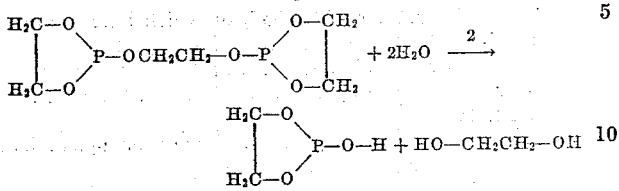

242 grams (one mol) of triethylene diphosphite were mixed with 100 ml. of acetonitrile and then 36 grams (2 mols) of water were gradually added at a temperature which was maintained between 20 and 40° C. by external cooling. The mixture was then stripped of acetonitrile at atmospheric pressure, the ethylene glycol formed distilled off at 55 to 60° C. at one mm. and finally the ethylene phosphite was then recovered by distillation as in Example 1. The yield was essentially quantitative, 216 grams.

Example 3

184 grams (one mol) of phenylethylene phosphite was added to 184 grams of the heel from a previous run (substantially pure ethylene phosphite). Then 180 grams (10 mols) of water and 1840 grams (10 mols) of phenylethylene phosphite were simultaneously gradually added while the temperature was maintained at 20 to 40° C. The phenol was stripped off at a pot temperature of 90 to 125° C. at 10 mm. The ethylene phosphite product was then distilled off at 110 to 130 ° C. at 0.1 to 1.0 mm. until 1000 grams were obtained. The remainder of the ethylene phosphite was left in the pot as a heel for the next run and the process was repeated in identical fashion. This procedure could be repeated almost indefinitely if desired and after the last run the residue distilled to recover all the ethylene phosphite remaining.

Example 4

This example illustrates the fact that arylethylene phosphites hydrolyze much more rapidly than benzylethylene phosphite under identical conditions.

Phenylethylene phosphite was hydrolyzed by water at 20° C. to ethylene phosphite in 2 minutes. Under identical conditions employing benzylethylene phosphite in place of phenylethylene phosphite, there was only 11% hydrolysis after ten minutes.

We claim:

1. A process of preparing ethylene phosphite comprising hydrolyzing a phosphite selected from the group consisting of aryl ethylene phosphites, halo-arylethylene phosphites and triethylene diphosphite with water.

2. A process according to claim 1 wherein there is employed about one equivalent of water for each heterocyclic ring in the starting phosphite.

3. A process of preparing ethylene phosphite comprising hydrolyzing an aryl ethylene phosphite with water.

4. A process of preparing ethylene phosphite comprising hydrolyzing phenyl ethylene phosphite with water.

5. A process according to claim 4 wherein there is used about one mol of phenylethylene phosphite per mol of water.

6. A process according to claim 4 wherein the hydrolysis is carried out in the presence of a solvent.

7. A process according to claim 6 wherein the solvent is acetonitrile.

8. A process according to claim 4 wherein the hydrolysis is carried out in the presence of a heel of ethylene phosphite from a previous reaction.

9. A process of preparing ethylene phosphite comprising hydrolyzing triethylene diphosphite with water.

10. A process according to claim 9 wherein there is used about one mol of triethylene diphosphite per mol of water.

11. A process according to claim 9 wherein the hydrolysis is carried out in the presence of a solvent.

12. A process according to claim 11 wherein the solvent is acetonitrile.

13. A process according to claim 9 wherein the hydrolysis is carried out in the presence of a heel of ethylene phosphite from a previous reaction.

No references cited.